United States Patent [19]

Sasaki

[11] Patent Number: 5,734,424
[45] Date of Patent: Mar. 31, 1998

[54] IMAGE PICKUP APPARATUS CAPABLE OF PROVIDING MOVING VIDEO SIGNAL AND STILL VIDEO SIGNAL

[75] Inventor: Takashi Sasaki, Yokohama, Japan

[73] Assignee: Canon Kabushiki Kaisha, Tokyo, Japan

[21] Appl. No.: 311,205

[22] Filed: Sep. 23, 1994

Related U.S. Application Data

[63] Continuation of Ser. No. 204,816, Mar. 2, 1994, abandoned, which is a continuation of Ser. No. 740,307, Aug. 5, 1991, abandoned.

[51] Int. Cl.⁶ .................................................. H04N 9/04
[52] U.S. Cl. ........................ 348/222; 348/231; 348/277; 348/279; 348/220; 358/909.1
[58] Field of Search ............................. 348/222, 231, 348/266, 270, 271, 273, 276, 277, 279, 280, 220; 358/909.1, 41, 42, 43, 44, 909; H04N 9/04

[56] References Cited

U.S. PATENT DOCUMENTS

| | | | |
|---|---|---|---|
| 4,558,368 | 12/1985 | Aoki | 358/909 |
| 4,670,777 | 6/1987 | Ishikawa | 358/44 |
| 4,712,135 | 12/1987 | Hashimoto | 358/909 |
| 4,763,204 | 8/1988 | Kinoshita | 358/909 |
| 4,775,885 | 10/1988 | Sato | 358/44 |
| 4,805,037 | 2/1989 | Noble | 358/909 |
| 4,831,453 | 5/1989 | Takemura | 358/213.19 |
| 4,833,527 | 5/1989 | Kondo | 358/44 |
| 4,839,734 | 6/1989 | Takemura | 358/909 |
| 4,878,121 | 10/1989 | Hynecek | 358/909 |

*Primary Examiner*—Sherrie Hsia
*Attorney, Agent, or Firm*—Robin, Blecker, Daley and Driscoll

[57] ABSTRACT

An image pickup apparatus including: an image pickup device; a mode selection circuit for selecting a mode from a group consisting of a video camera mode and a still video camera mode; a first drive circuit for, when the video camera mode is selected by the mode selection circuit, driving the image pickup device to perform an interlace-scanning operation so as to read vertically-disposed two pixels while being mixed with each other; a second drive circuit for, when the still video camera mode is selected by the mode selection circuit, driving the image pickup device to perform an interlace-scanning operation so as to read each row; a memory for recording a first field signal and a second field signal of the image pickup device at the time of the operation performed by the second drive circuit; an addition circuit for adding the first field signal of the memory and the second field signal of the same to each other; and a signal processing circuit for performing a signal process so as to generate a luminance signal and a chrominance signal in such a manner that it receives the output from the image pickup device when the video camera mode is selected by the mode selection circuit and receives the output from the addition circuit when the still video camera mode is selected by the same.

10 Claims, 9 Drawing Sheets

FIG. 1A
(PRIOR ART)

|   |   |   |
|---|---|---|
| R | G | B |
| R | G | B |
| R | G | B |
|   |   |   |

FIG. 1B
(PRIOR ART)

|    |    |    |
|----|----|----|
| Cy | Gr | Ye |
| Cy | Gr | Ye |
| Cy | Gr | Ye |
|    |    |    |

FIG. 1C
(PRIOR ART)

|   |   |   |   |
|---|---|---|---|
| R | G | R | G |
| R | G | R | G |
| B | G | B | G |
| B | G | B | G |
|   |   |   |   |

FIG. 1D
(PRIOR ART)

| ROW |    |    |    |    |
|-----|----|----|----|----|
| 1   | Mg | Gr | Mg | Gr |
| 2   | Cy | Ye | Cy | Ye |
| 3   | Mg | Gr | Mg | Gr |
| 4   | Ye | Cy | Ye | Cy |

| Gr | Mg | Ye | Cy |
| --- | --- | --- | --- |
| Mg | Gr | Cy | Ye |
| Gr | Mg | Ye | Cy |
| Mg | Gr | Cy | Ye |

FIG. 3B
(PRIOR ART)

| Mg | Cy | Cy | Mg | Mg | Ye | Ye | Mg |
| --- | --- | --- | --- | --- | --- | --- | --- |
| Gr | Ye | Ye | Gr | Gr | Cy | Cy | Gr |

| W | Gr |
|---|---|
| Cy | Ye |
| W | Gr |
| Ye | Cy |

FIG. 5B

| Mg | Gr |
|---|---|
| Cy | Ye |
| Gr | Mg |
| Cy | Ye |
| Mg | Gr |

A → (row 1)
B → (row 2)

FIG. 5C

| A | B |
|---|---|
| C | D |
| A | B |
| D | C |

|  |  |  |  |  |
|---|---|---|---|---|
| FIRST FIELD { | W | G | W | G |
| | Cy | Ye | Cy | Ye |
| FIRST FIELD { | W | G | W | G |
| | Cy | Ye | Cy | Ye |

(rows 2 and 3 = SECOND FIELD)

FIG. 10

| Cy | G | Cy | G |
|---|---|---|---|
|  | W | W | W |
| Cy | G | Cy | G |

IMAGE PICKUP APPARATUS CAPABLE OF PROVIDING MOVING VIDEO SIGNAL AND STILL VIDEO SIGNAL

This is a continuation application under 37 CFR 1.62 of prior application Ser. No. 08/204,816, filed Mar. 2, 1994, now abandoned which is a continuation of Ser. No. 07/740, 307, filed Aug. 5, 1991, now abandoned.

BACKGROUND OF THE INVENTION

1. Field of the Invention

The present invention relates to an image pickup apparatus capable of performing a video movie camera (hereinafter called a "video camera") mode and a still video camera mode.

2. Related Background Art

Figure 1A:
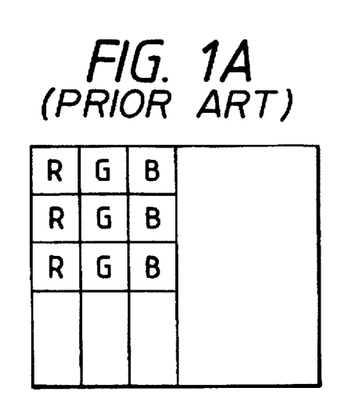
FIGS. 1A to 1D illustrate examples of the configuration of color filters.
Figure 1B:
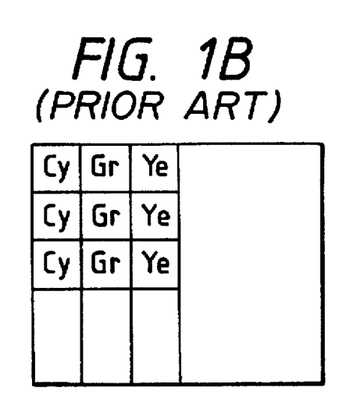

Hitherto, a still video camera has been usually adapted to an image pickup method arranged for a private video camera. The color filters for the private video camera have been disposed in accordance with a pure-color or complementary stripe filter system arranged as shown in FIGS. 1A and 1B. Another system of G (green) stripe and R (red)/B (blue) line sequential system arranged as shown in FIG. 1C and a complementary mosaic system arranged as shown in FIG. 1D have been put into practical use or disclosed.

Figure 1C:
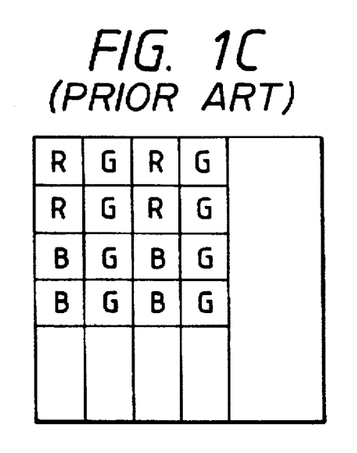
Figure 1D:
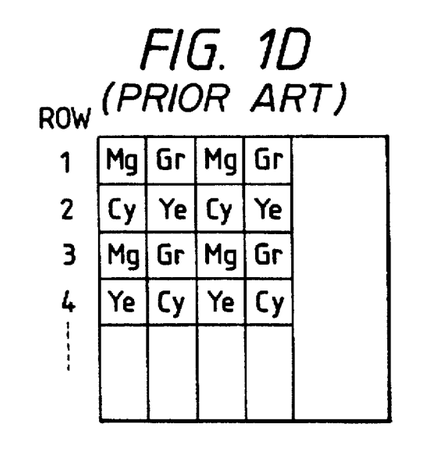
Figure 2:
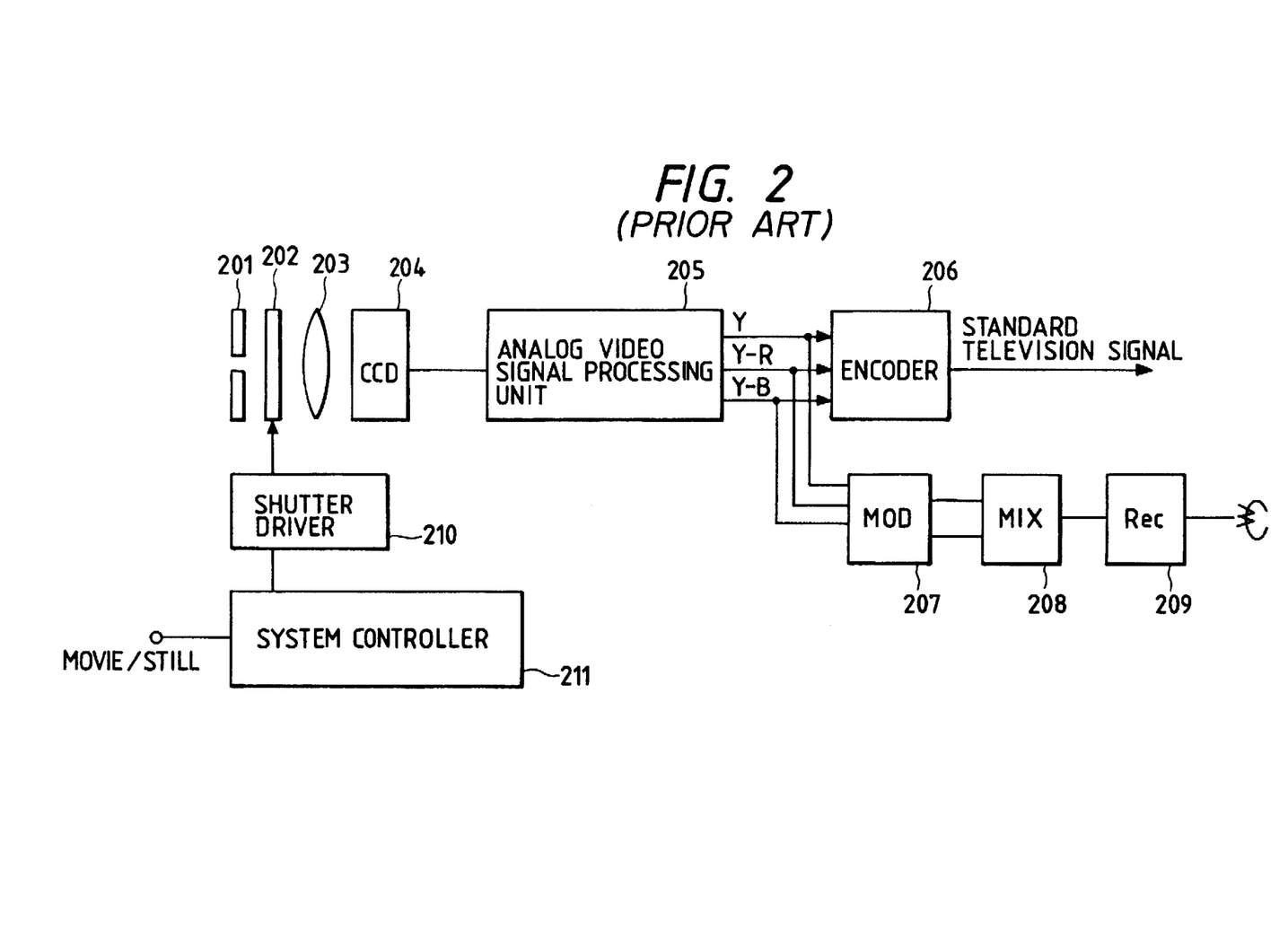
FIG. 2 is a structural view which illustrates a conventional structure.

In a case where an image pickup device to which the stripe-configuration color filters arranged as shown in FIGS. 1A and 1B or the color filters arranged as shown in FIG. 1C are fastened is used, a frame image is also obtained at the time of the still video camera mode. Also a movie image (kinetic image) is obtained for use in a video camera. Therefore, a still video camera also capable of performing a video camera operation can easily be constituted by arranged its structure as shown in FIG. 2.

That is, at the time of the video camera mode, a shutter 202 is opened so as to video-operate a CCD (Charge-Coupled Device) 204 which is an image pickup device. The output from the CCD 204 is processed in a common analog-video signal processing portion 205 so that a luminance signal and a chrominance signal are generated before they are converted into reference television signal by an encoder 206.

At the time of the still video camera mode, the shutter 202 is opened one time so as to read the accumulated charge by the same method employed at the time of the video camera mode. As a result, the luminance and the chrominance signals can be obtained before they are modulated so as to be recorded to a video floppy disk.

Furthermore, it has been considered that, when the color filters arranged as shown in FIG. 1D are used to constitute the similar structure, a still video camera revealing further improved resolution and high sensitivity and capable of performing a video camera operation can be constituted.

As for the resolution, a fact has been disclosed in, for example, "Present Technology for Excellent Image Quality in a Private Video Movie", Electronics Essentials, No. 21, July 1989, written by Kunio Imai, that, assuming that the number of the horizontal directional pixels of the image pickup device is N, the horizontal resolution is unsatisfactory, that is, 0.44N TV-lines or less in a structure in which the stripe filter is employed. However, in a case where a filter structured in such a manner that two pixels are repeated in the horizontal direction as shown in FIGS. 1C and 1D, a horizontal resolution of 0.65N TV-lines can be obtained. That is, it is advantageous to arrange the structure as shown in FIGS. 1C and 1D.

In comparison made between pure color and complementary color, the complementary color reveals an advantage in terms of efficiently utilizing the incidental light beam and improving the sensitivity because the complementary color exhibits higher mean transmissivity.

Although the stripe system has an advantage to simplify the signal processing operation and reducing the overall size of the apparatus, the problem of the excessive enlargement of the apparatus size can be overcome even if the color filter arranged as shown in FIGS. 1C and 1D is employed because of the recent progress of the IC technology.

It has been considered that the pure color exhibits an advantage in terms of improving the color reproducibility and the S/N ratio of the color. However, the complementary color system is able to exhibit satisfactory color reproducibility thanks to the progress of the signal processing technology.

Therefore, it might be considered preferable that the complementary color mosaic type image pickup device arranged as shown in FIG. 1D be employed in a case where a video camera or a still video camera exhibiting excellent sensitivity is desired.

In fact, a major portion of the available public video cameras employ the color filter configuration arranged as shown in FIG. 1D.

As described above, although the image quality can be significantly improved in a case where the still video camera is constituted by employing the configuration shown in FIG. 1D, there arises a critical problem.

That is, if the still video camera is constituted by employing an image pickup device in which the color filters are arranged as shown in FIG. 1D, no frame picture cannot be obtained. Therefore, the structure undesirably serves as a field picture exclusive camera.

The reason for this will now be described.

A CCD, to which the filters arranged as shown in FIG. 1D are fastened, usually performs the reading operation in the video mode in such a manner that the first row and the second row are mixed and added to each other in the first horizontal scanning period and the third row and the fourth row are mixed and added to each other in the second horizontal scanning period. Therefore, signals (Mg+Cy) and (Gr+Ye) are alternately obtained in the odd horizontal scanning periods. On the other hand, signals (Mg+Ye) and (Gr+Cy) are alternately obtained in the even horizontal scanning periods, where symbols Mg represent magenta, Cy represents cyan, Gr represents green and Ye represents yellow.

The above-described signals are added and/or subtracted so that a luminance signal and a chrominance signal are obtained, resulting the following fact:

In the odd horizontal scanning periods,

Luminance signal $Y_{2n+1}$=Mg+Cy+Gr+Ye

Chrominance signal $C_{2n+1}$=(Mg+Cy)−(Gr+Ye)

In the even horizontal scanning periods,

Luminance signal $Y_{2n}$=Mg+Ye+Gr+Cy

Chrominance signal $C_{2n}$=(Mg+Ye)−(Gr+Cy)

Therefore, by making the chrominance signal to be synchronous by using a 1H (horizontal scanning period) delay line or the like, a luminance signal and two chrominance signals are obtained in each horizontal scanning period. As a result, the field picture of the first field can be formed. Since a light beam is made incident upon the image pickup device via a lens in a case of the video camera mode, the accumulation of charges is commenced immediately after the first field has been read. Therefore, the second field can be formed similarly by, in the next field, mixing and adding the second row and the third row and mixing and adding the fourth row and the fifth row. Consequently, the frame picture can be obtained.

However, since the exposure is, in the still video camera, performed only one time at the time of the shutter opening, no charge is left in the CCD after the charges have been read out by the operation of reading the first field. Therefore, the second field cannot be formed. As a result, the frame picture cannot be obtained.

In order to overcome the above-described problem, it might be considered feasible to employ a structure arranged as follows: the mixture reading of the vertically-disposed two pixels of the CCD in which the color filter configuration is arranged as shown in FIG. 1D is replaced by a method arranged in such a manner that the first row is read in the first horizontal scanning period for the first field, the third row is read in the second horizontal scanning period, the second row is read in the first horizontal scanning period for the second field and the fourth row is read in the second horizontal scanning period.

However, the color image cannot be formed from only the two signals because Mg and Gr signals are read out in any one of the horizontal scanning periods in the first field.

Therefore, it has been impossible for the still video camera to obtain the frame picture if the configuration arranged as shown in FIG. 1D is employed.

Figure 3A:
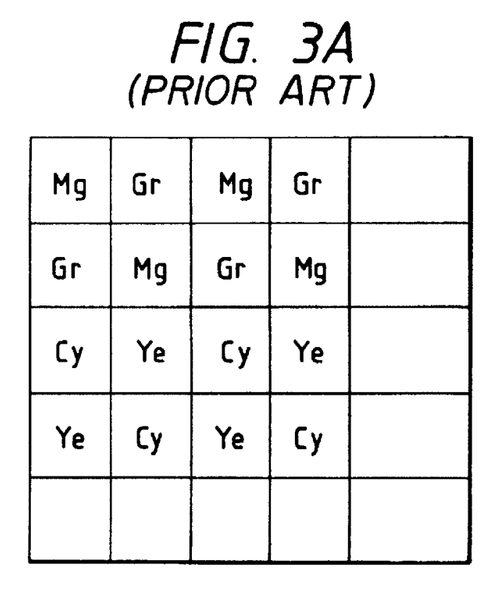
FIGS. 3A and 3B illustrate the configuration of color filters according to the conventional structure.
Figure 3B:
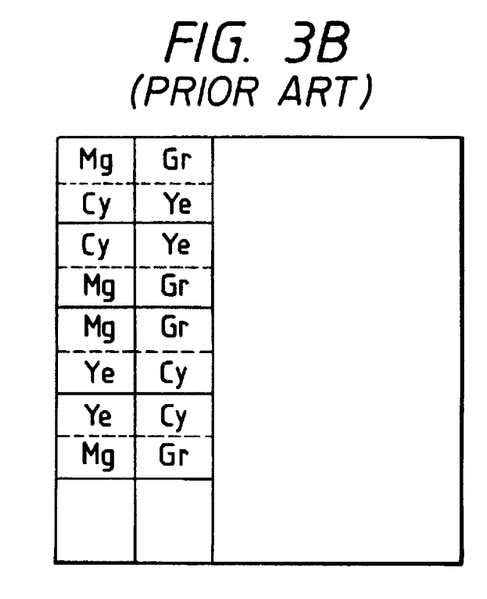

Accordingly, in order to obtain the frame picture in a still video camera while maintaining the advantages obtainable from the complementary color mosaic system, a system has been suggested which is arranged in such a manner that a configuration disclosed as shown in FIG. 3A in "Pseudo Field Accumulation CCD Color Camera" of TV society technology report TEBS 87-7 ED87-12 Feb. 1987, written by a group including Shimura or a configuration arranged as shown in FIG. 3B (executed in a still video camera Canon RC-470) is read while eliminating the vertical mixture addition.

However, in the case shown in FIG. 3A, the luminance signal in the first horizontal scanning period is formed by Mg and Gr and that in the second horizontal scanning period is formed by Cy and Ye. Therefore, the luminance for each 1H slightly differs from each other, causing a problem called a phenomenon "luminance gap" to be generated.

In a case shown in FIG. 3B, a necessity arises in that the filter must be coupled to each other by pasting after dividing the pixel into two sections. Therefore, the process of manufacturing the image pickup device becomes too complicated, causing the cost of the device to be raised excessively.

SUMMARY OF THE INVENTION

Accordingly, an object of the present invention is to provide an image pickup apparatus employing an image pickup device in which the color filters arranged as shown in FIG. 1D are provided so that the frame picture can be obtained in the video camera mode and the still video camera mode.

In order to achieve the above-described object, according to one aspect of the present invention, there is provided an image pickup apparatus structured as shown in (1), (2) and (3):

(1) An image pickup apparatus comprising elements a to g:
 a. an image pickup device having color filters A, B, C and D of different colors which are disposed in a pattern repeated in the lateral and vertical directions and arranged on 8 pixels, which are composed of two pixels in the lateral direction and 4 pixels in the vertical direction, in such a manner that the color filters A and B are disposed on the first row, the color filters C and D are disposed on the second row, the color filters A and B are disposed on the third row and the color filters D and C are disposed on the fourth row;
 b. mode selection means for selecting a mode from a group consisting of a video camera mode and a still video camera mode;
 c. first drive means for, when the video camera mode is selected by the mode selection means, driving the image pickup device to perform an interlace-scanning operation so as to read vertically-disposed two pixels while being mixed with each other;
 d. second drive means for, when the still video camera mode is selected by the mode selection means, driving the image pickup device to perform an interlace-scanning operation so as to read each row;
 e. a memory for recording a first field signal and a second field signal of the image pickup device at the time of the operation performed by the second drive means;
 f. addition means for adding the first field signal of the memory and the second field signal of the same to each other; and
 g. signal processing means for performing a signal process so as to generate a luminance signal and a chrominance signal in such a manner that it receives the output from the image pickup device when the video camera mode is selected by the mode selection means and receives the output from the addition means when the still video camera mode is selected by the same.

(2) An image pickup apparatus according to (1), wherein the image pickup device has color filters A, B, C and D of different colors which are disposed in a pattern repeated in the lateral and vertical directions and arranged on 8 pixels, which are composed of two pixels in the lateral direction and 4 pixels in the vertical direction, in such a manner that the color filters A and B are disposed on the first row, the color filters C and D are disposed on the second row, the color filters A and B are disposed on the third row and the color filters D and C are disposed on the fourth row and the four different color filters are cyane, magenta, yellow and green filters.

(3) An image pickup apparatus the operation of which comprising: a video camera mode in which vertically-disposed two pixels are read while being mixed with each other; and a still video camera mode in which a field memory is used to obtain a signal similar to that obtainable at the time of reading out the vertically-disposed two pixels while being mixed with each other.

According to the structures (1), (2) and (3), the image pickup device in which the color filters are structured (color configuration) as described above is employed so that a frame image obtainable from reading of vertically-disposed two pixels or equivalent can be recorded in both of the video camera mode and the still video camera mode.

Another object of the present invention is to provide a still video camera capable of obtaining a frame picture signal equivalent to that obtainable from mixture-reading of vertically-disposed two pixels.

In order to achieve the above-described object, according to another aspect of the present invention, there is provided any one of (1), (2) and (3);

(1) A still video camera comprising:
 a. an image pickup device;
 b. drive means for driving the image pickup device to perform an interlace scanning operation so as to read each row;

c. a memory for recording a first field signal of the image pickup device and a second field signal of the same;

d. addition means for adding the first field signal in the memory and the second field signal of the image pickup device or the second field signal in the memory to each other; and e. signal processing means for receiving the output from the addition means so as to generate a luminance signal and a chrominance signal by a signal process.

(2) A still video camera according to (1), wherein the image pickup device has color filters A, B, C and D of different colors which are disposed in a pattern repeated in the lateral and vertical directions and arranged on 8 pixels, which are composed of two pixels in the lateral direction and 4 pixels in the vertical direction, in such a manner that the color filters A and B are disposed on the first row, the color filters C and D are disposed on the second row, the color filters A and B are disposed on the third row and the color filters D and C are disposed on the fourth row and the four different color filters are cyane, magenta, yellow and green filters.

(3) A still video camera comprising:

a frame memory, wherein a frame image signal similar to that obtainable when vertically-disposed two pixels are read while being mixed with each other is obtained.

According to the structures (1), (2) and (3), a still video camera can be obtained which is capable of recording a frame picture equivalent to that obtainable from mixture-reading vertically-disposed two pixels.

Another object of the present invention is to provide a still video camera capable of forming, by the image pickup device thereof, a frame picture signal while eliminating a necessity of using a precise A-D converter, a D-A converter and a large capacity memory.

In order to achieve the above-described object, according to another aspect of the present invention, there is provided a still video camera structured as shown in (1) or (2):

(1) A still video camera having an image pickup device to which color filters of three or more different colors are fastened so as to read out signals of all of pixels by a one-field scanning operation, the still video camera comprising elements a to f:

a. means for A-D converting signals of pixels on odd rows selected from signals of all of the pixels so as to record the signals to a first field memory;

b. means for A-D converting signals of pixels on even rows selected from signals of all of the pixels so as to record the signals to a second field memory;

c. analog processing means for forming a chrominance signal from the signals of all of the pixels;

d. means for A-D converting the chrominance signal so as to record the chrominance signal to a third memory;

e. means for performing two different calculations in accordance with the content of the first field memory and that of the second field memory so as to form a frame signal denoting the luminance; and f. means for forming a frame signal denoting the chrominance from the content of the third memory by performing an interpolating operation.

(2) A still video camera according to (1), wherein the third memory is a field memory.

According to the structures (1) and (2), the frame picture signal can be formed while eliminating a necessity of using a precise A-D converter, a D-A converter and a large capacity memory.

Other and further objects, features and advantages of the invention will be appear more fully from the following description.

DETAILED DESCRIPTION OF THE PREFERRED EMBODIMENTS

Figure 4:
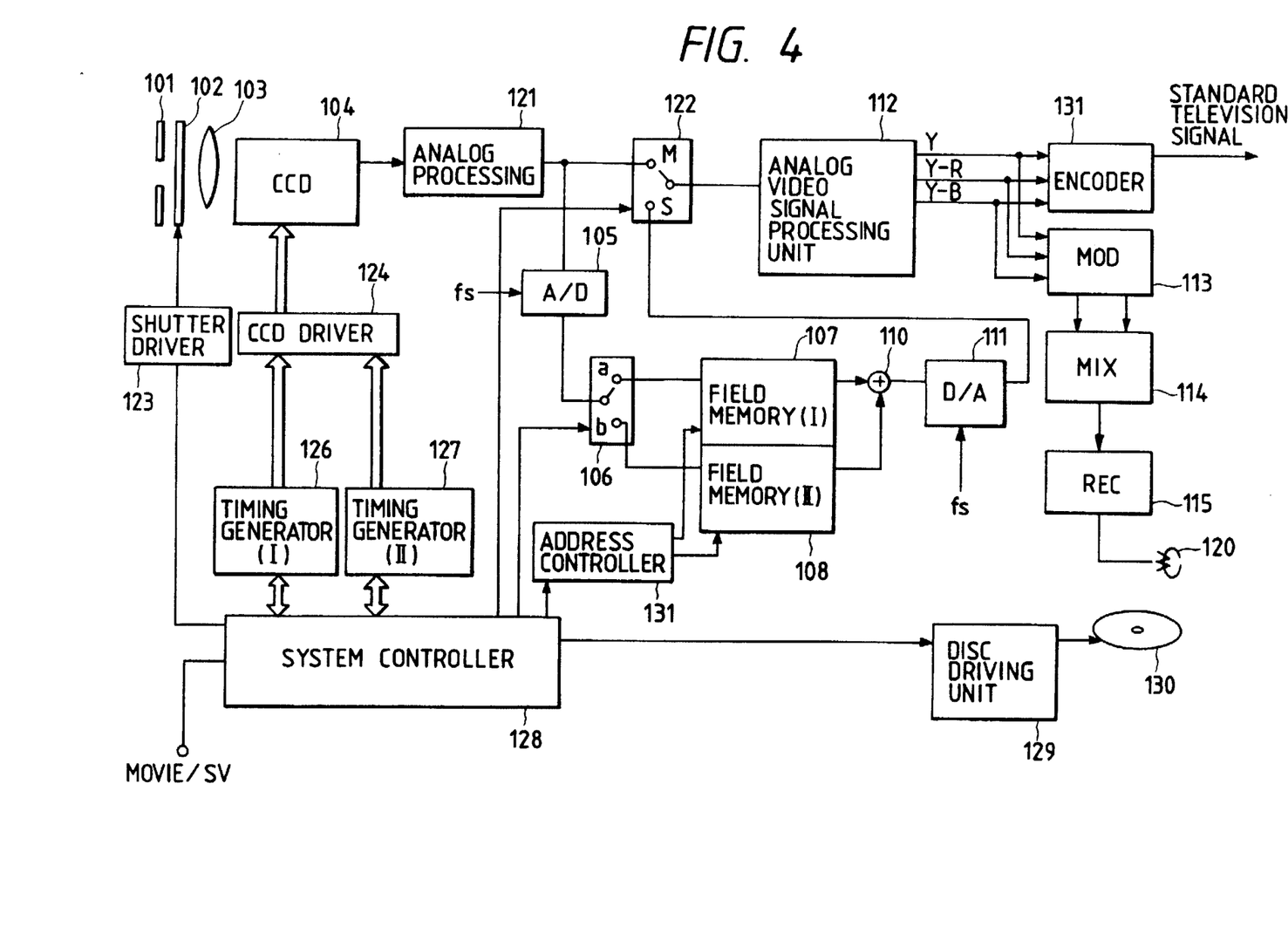
FIG. 4 is a structural view which illustrates an embodiment of the present invention.

Preferred embodiments of the present invention will now be described. FIG. 4 is a structural view which illustrates an embodiment of an image pickup apparatus according to the present invention. The image pickup apparatus according to this embodiment has color filters arranged as shown in FIG. 1D and provided for a CCD 104. When a selection switch for selecting a video camera mode or a still video camera mode (omitted from illustration) is operated, the video camera operation or the still video camera operation can be performed.

In a case where the still video camera mode is selected, a signal transmitted from the action of a shutter button (omitted from illustration) causes a shutter 102 to be opened for a proper time. During this, charges are accumulated in accordance with an optical image formed in each pixel of the CCD 104 by a lens 103. The charge of the pixel, of course, is cleared to zero before the shutter 102 is opened. A system controller 128 again closes the shutter 102 via a shutter driver 123 before it reads out only one row in one horizontal scanning period while interlacing the CCD 104 via a first system timing generator 126 for the still video camera and a CCD driver 124. That is, the first, third, fifth, . . . rows are read in the first field, while the second, fourth, sixth, . . . rows are read in the second field.

The signals thus-read out are subjected to CDS (correlation double sampling) or plany in an analog processing portion 121 before they are A/D converted by an A/D converter 105 at a clock for each pixel. It is preferable that the number of bits is 10 or more so as to prevent the quantization error of the color signal. In a case where the still video camera mode is selected, the system controller 128 turns the switch 122 to a terminal S.

When the first field is read, a switch 106 is connected to a terminal a, the result of the A/D conversion is stored in a first field memory 107. In this case, signals denoting Mg and Gr are stored in the first field memory 107. When the second field is read, the switch 106 is connected to a terminal b so that the result of the A/D conversion is stored in the second field memory 108. In this case, signals denoting Cy and Ye are stored in the second field memory 108.

Then, the field memory 107 and the field memory 108 are sequentially and simultaneously read by corresponding address-scanning so as to add the results of the reading operations by an adder 110.

As a result, the following outputs are made from the adder 110:

In the odd horizontal scanning period (2n−1), the sum of Mg on the (4n−3)-th row and Cy on the (4n−2)-th row and the sum of Gr on the (4n−3)-th row and Ye on the (4n−2)-th row are alternately transmitted, where n=1, 2, . . . , 262.

In the even horizontal scanning period (2n), the sum of Mg on the (4n−1)-th row and Ye on the 4n-th row and the sum of Gr on the (4n−1)-th row and Cy on the 4n-th row are transmitted. That is, a similar output obtainable at the time of reading out the CCD 104 in such a manner that the two vertically disposed pixels are read while being mixed with each other can be obtained.

Then, the system controller 128 commences the sequential reading operation at the second row of the first field memory 107 and the first row of the second field memory 108 via an address controller 131. As a result, during the time in which Mg on the second row of the first field memory 107, that is, Mg on the third row in the CCD 104, is being read out, Cy on the first row of the second field memory 108, that is, Cy on the second row in the CCD104, is read out.

As a result, the following outputs from the adder 110 are made:

In the odd horizontal scanning period (2n−1), the sum of Cy on the (4n−2)-th row and Mg on the (4n−1)-th row and the sum of Ye on the (4n−2)-th row and Gr on the (4n−1)-th row are alternately transmitted. In the even horizontal scanning period (2n), the sum of Ye on the 4n-th row and Mg on the (4n+1)-th row and the sum of Cy on the 4n-th row and Gr on the (4n+1)-th row are alternately transmitted.

Since the result of the calculations performed by the adder 110 is connected to the D/A converter 111, the outputs from the D/A converter 111 are made as follows:

(1) At the time of reading the first memory:

An analog output is made which is similar to that from the first field when the CCD 104 is read in such a manner that the vertically-disposed two pixels are read while being mixed with each other.

(2) At the time of reading the ensuing memories:

An analog output is made which is similar to that from the second field when the CCD 104 is read in such a manner that the vertically-disposed two pixels are read while being mixed with each other.

The switch 122 has been connected to the terminal S, the output from the D/A converter 111 is supplied to an analog video signal processing portion 112 so that luminance signal Y and two chrominance signals Y - R and Y - B are generated. The signals thus-generated are modulated by a conversion portion 113 into a luminance modulation signal and chromaticity modulation signal before they are mixed in a mixing portion 114. Then, a recording head 120 is driven by a recording amplifier 115 so that an image is recorded onto a floppy disk 130.

The analog video signal processing portion 112 may be constituted in accordance with any one of a chrominance processing system, a YRB system and an RGB primary color separation system disclosed in monographs "Image Design Workshop Fine Imaging in Still Video Camera System", by Sasaki, Aug. 1989.

As described above, operations are performed in the still video camera mode.

On the other hand, when the video camera operation is selected, the system controller 128 supplies a timing pulse generated in a second timing generator 127 for a video camera to the CCD 104 via a CCD driver 124 so that the CCD 104 is read in an interlace manner performed in such a manner that the vertically-disposed two pixels are read while being mixed with each other.

Since the above-described operation is the same as that performed according to the conventional structure, its description is omitted here. The switch 122 is turned to the terminal M by the system controller 128 in this case, the output from the CCD 104 is directly supplied to the analog video signal processing portion 112 so that the luminance signal Y and the two chrominance signals Y - R and Y - B are generated before they are supplied to an encoder 131 so as to be transmitted as a reference television signal.

In the case of the video camera operation, the system controller 128 drives the shutter driver 123 so as to make the shutter 102 to be continuously opened.

Figure 5A:
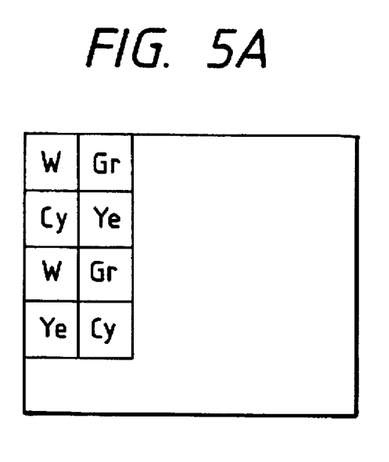
FIGS. 5A to 5C illustrate the configuration of color filters according to the present invention.

The present invention is not limited to the colors of the color filters to Mg, Gr, Cy and Ye. The other color filters may be employed if the structure is, as shown in FIG. 5A, arranged in such a manner that four filters of individual colors such as W (white: transparent), Gr, Cy, Ye or the like are disposed to meet the illustrated pattern. As an alternative to this, pure color filters may be employed.

Figure 5B:
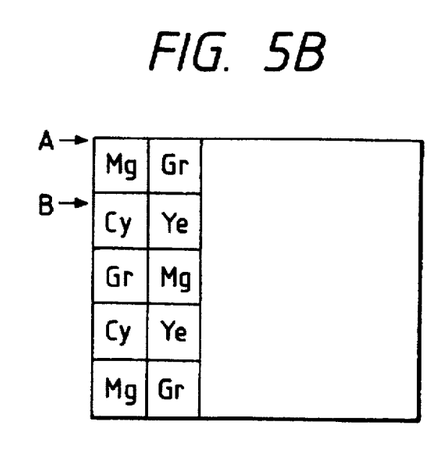

In a case of FIG. 5B, the filters are arranged, when viewed from A, in such a manner that Mg→Gr→Cy→Ye→Gr→Mg→Cy→Ye. The same are arranged, when viewed from B, Cy→Ye→Gr→Mg→Cy→Ye→Mg→Gr. This case is considered to be the same pattern as that shown in FIG. 5C.

Figure 5C:
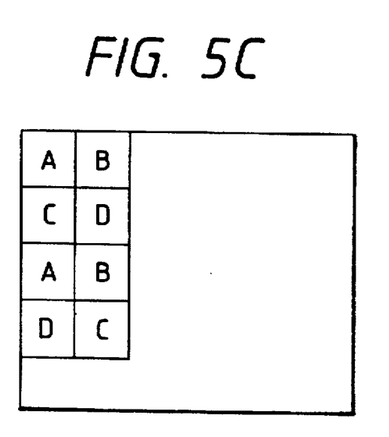

As described above, according to the present invention, the image pickup device having the color filters of the type as shown in FIG. 5C is used so that high resolution and high sensitive frame image can be recorded in both of the video camera mode and the still video camera mode.

Then, a second embodiment of the present invention will now be described.

Figure 6:
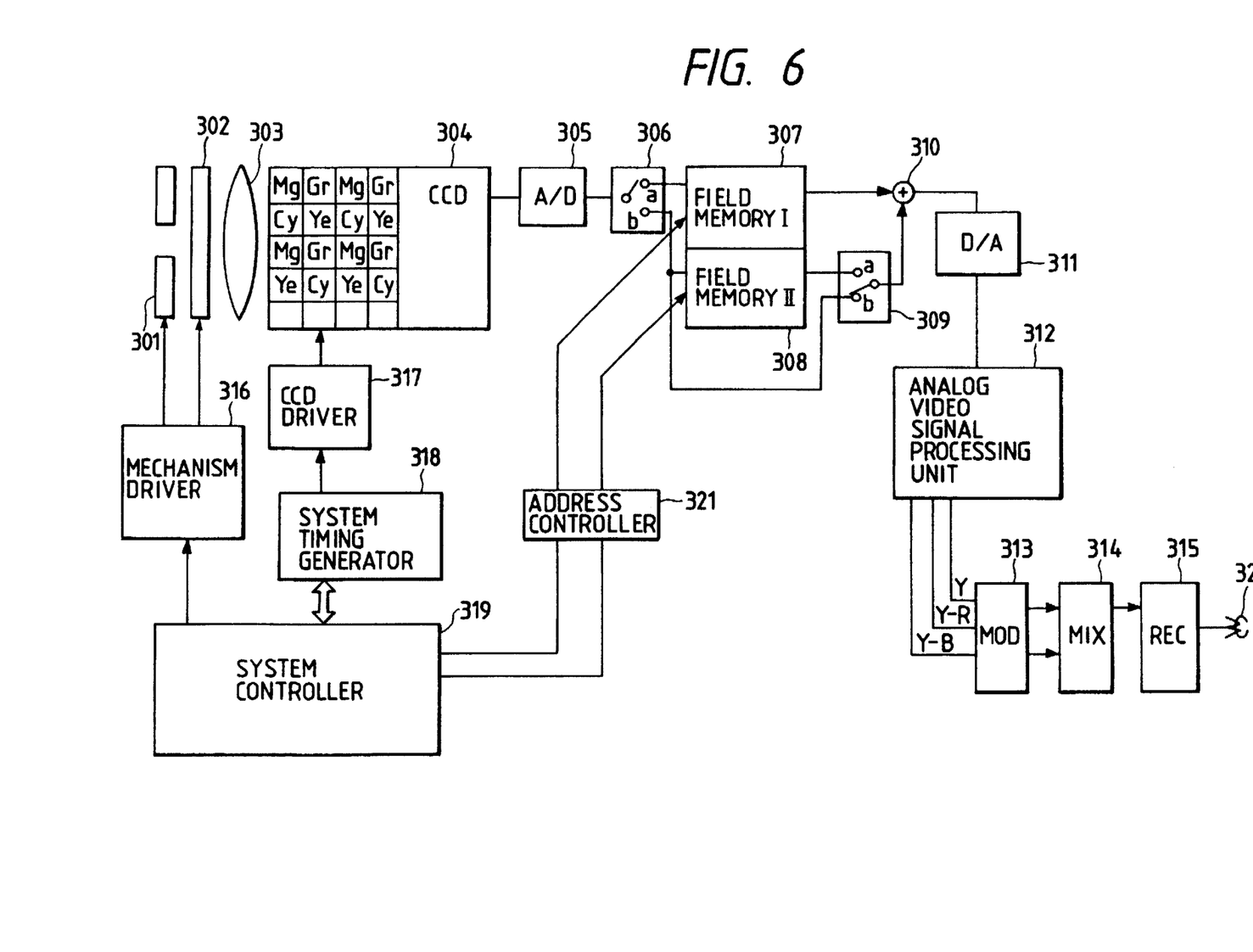
FIG. 6 is a structural view which illustrates a second embodiment of the present invention.

FIG. 6 is a structural view of a still video camera according to the second embodiment of the present invention. A signal transmitted from the action of a shutter button (omitted from illustration) causes a shutter 302 to be opened for a proper time. During this, charges are accumulated in accordance with an optical image formed in each pixel of the CCD 304 by a lens 303. The charge of the pixel, of course, is cleared to zero before the shutter 302 is opened. A system controller 319 again closes the shutter 302 via a mechanism driver 316 before it reads out only one row in one horizontal scanning period while interlacing the CCD 304 via a system timing generator 318 and a CCD driver 317. That is, the first, third, fifth, . . . rows are read in the first field, while the second, fourth, sixth, . . . rows are read in the second field.

The signals thus-read out are A/D converted by the A/D converter 105 at a clock for each pixel. It is preferable that the number of bits is 10 or more so as to prevent the quantization error of the color signal.

When the first field is read, a switch 306 is connected to a terminal a, the result of the A/D conversion is stored in a first field memory 307. In this case, signals denoting Mg and Gr are stored in the first field memory 307. When the second field is read, the switch 306 is connected to a terminal b so that the result of the A/D conversion is stored in the second field memory 308. In this case, signals denoting Cy and Ye are stored in the second field memory 308. By connecting the switch 309 is connected to the terminal b, the result of the A/D conversion is also supplied to an adder 310. At this time, the system controller 319 sequentially reads out the contents of the first field memory by using the address controller 321 so as to supply the result of reading to the adder 310. As a result, the following outputs are made from the adder 310:

In the odd horizontal scanning period (2n−1), the sum of Mg on the (4n−3)-th row and Cy on the (4n−2)-th row and the sum of Gr on the (4n−3)-th row and Ye on the (4n−2)-th row are alternately transmitted, where n=1, 2, . . . , 262.

In the even horizontal scanning period (2n), the sum of Mg on the (4n−1)-th row and Ye on the 4n-th row and the sum of Gr on the (4n−1)-th row and Cy on the 4n-th row are transmitted. That is, a similar output obtainable at the time of reading out the CCD 304 in such a manner that the two vertically disposed pixels are read while being mixed with each other can be obtained.

Then, the system controller 319 does not read the CCD 304, while the switch 309 is connected to the terminal a.

It commences the sequential reading operation at the second row of the first field memory 307 and the first row of the second field memory 308 via an address controller 321. As a result, during the time in which Mg on the second row of the first field memory 307, that is, Mg on the third row in the CCD 304, is being read out, Cy on the first row of the second field memory 308, that is, Cy on the second row in the CCD304, is read out.

As a result, the following outputs from the adder 310 are made:

In the odd horizontal scanning period (2n−1), the sum of Cy on the (4n−2)-th row and Mg on the (4n−1)-th row and the sum of Ye on the (4n−2)-th row and Gr on the (4n−1)-th row are alternately transmitted. In the even horizontal scanning period (2n), the sum of Ye on the 4n-th row and Mg on the (4n+1)-th row and the sum of Cy on the 4n-th row and Gr on the (4n+1)-th row are alternately transmitted.

Since the result of the calculations performed by the adder 310 is connected to the D/A converter 311, the outputs from the D/A converter 311 are made as follows:

(1) At the time of reading the first field of the CCD:
Data of no meaning is transmitted.

(2) At the time of reading the second field of the CCD:
An analog output is made which is similar to that when the CCD 304 is read in such a manner that the vertically-disposed two pixels are read while being mixed with each other.

(3) Next IV (vertical scanning) period:
An analog output is made which is similar to that from the second field when the CCD 304 is read in such a manner that the vertically-disposed two pixels are read while being mixed with each other.

Therefore, by supplying the output from the D/A converter 311 to an analog video signal processing portion 312 so that luminance signal Y and two chrominance signals Y - R and Y - B are obtained. The signals thus-generated are modulated by a modulation portion 113 into a luminance modulation signal and chromaticity modulation signal before they are mixed in a mixing portion 114. Then, a recording head 320 is driven by a recording amplifier 315 so that an image is recorded onto a floppy disk.

The analog video signal processing portion 312 may be constituted in accordance with any one of a chrominance processing system, a YRB system and an RGB primary color separation system disclosed in monographs "Image Design Workshop Fine Imaging in Still Video Camera System", by Sasaki, Aug. 1989.

Figure 7:
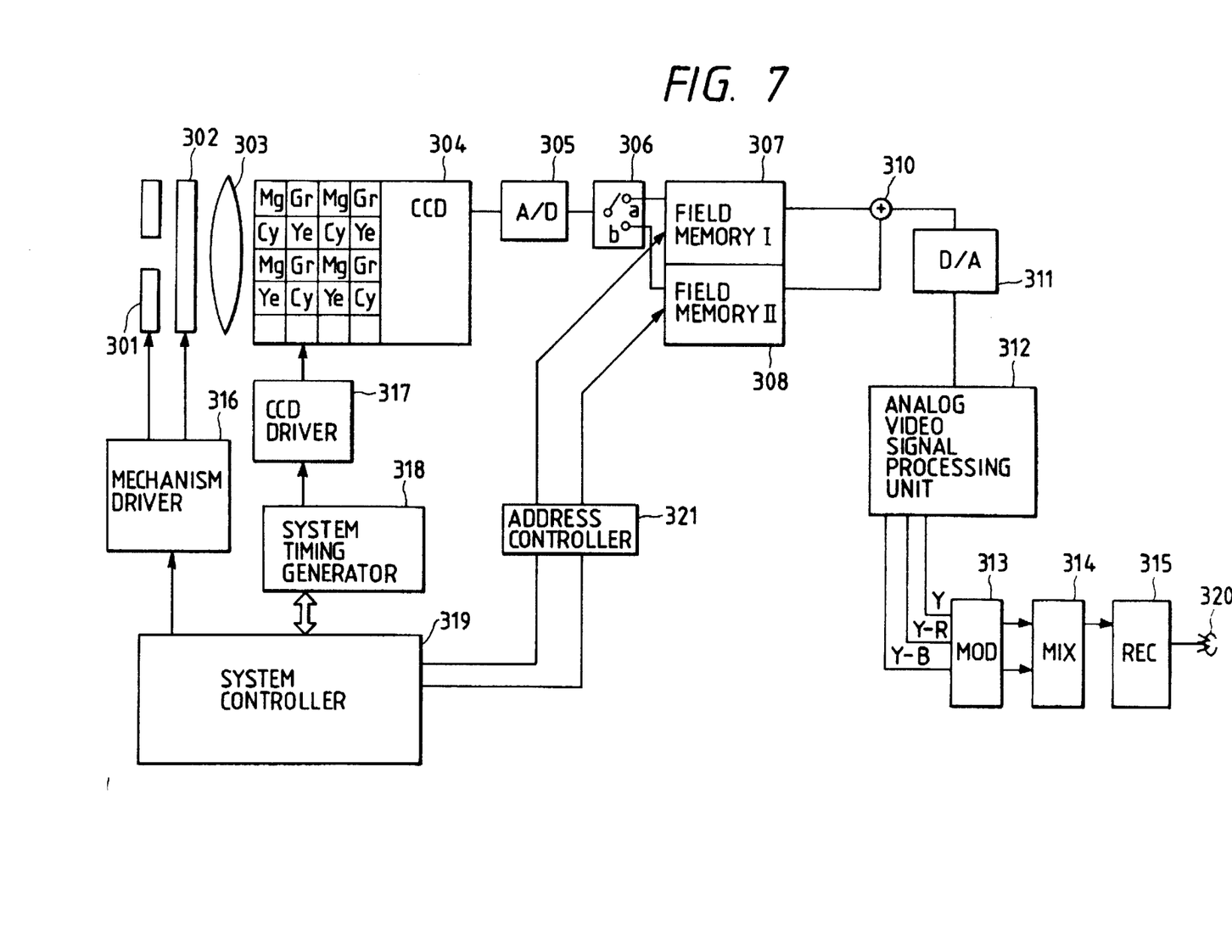
FIG. 7 is a structural view which illustrates a third embodiment of the present invention.

FIG. 7 is a structural view which illustrates a third embodiment of the present invention, where the same elements as those according to the second embodiments are given the same reference numerals and their descriptions are omitted here.

By reading the first field, Mg and Gr are written to the field memory 307.

By reading the second field, Cy and Ye are written to the field memory 308.

In the next IV, the address controller 321 is operated so that the n-th row of the field memory 307 and the n-th row of the field memory 308 are read.

In the ensuing IV, the address controller 321 is operated so that the (n+1)-th row of the field memory 307 and the n-th row of the field memory 308 are read.

As a result, although it is necessary to use 4 V, the switch 309 shown in FIG. 6 can be omitted from the structure. The others are the same as those according to the second embodiment.

The present invention is not limited to the colors of the color filters to Mg, Gr, Cy and Ye according to the above-described embodiments. The other color filters may be employed if the structure is, as shown in FIG. 5A, arranged in such a manner that four filters of individual colors such as W (white: transparent), Gr, Cy, Ye or the like as shown in FIG. 5C are disposed to meet the illustrated pattern.

In a case of FIG. 5B, the filters are arranged, when viewed from A, in such a manner that Mg→Gr→Cy→Ye→Gr→Mg→Cy→Ye. The same are arranged, when viewed from B, Cy→Ye→Gr→Mg→Cy→Ye→Mg→Gr. This case is considered to be the same pattern as that shown in FIG. 5C.

As described above, according to the present invention, the image pickup device having the color filters of the type as shown in FIG. 5C is used so that a still video camera can be obtained which is capable of recording a frame image of high resolution and high sensitivity.

The image pickup device having the color filter arranged as shown in FIG. 5C can easily be manufactured in comparison to that having the color filter arranged as shown in FIG. 3B. Furthermore, since it is an ordinary and thereby low cost product which is widely used for video cameras, the overall cost of the apparatus can be reduced.

Furthermore, since the ensuing video signal processing portion may be the same as that for the television camera, the integrated circuits for the video camera can be used in the processing portion. Therefore, the overall cost of the apparatus can further be reduced.

Then, a fourth embodiment of the present invention will now be described.

Figure 8:
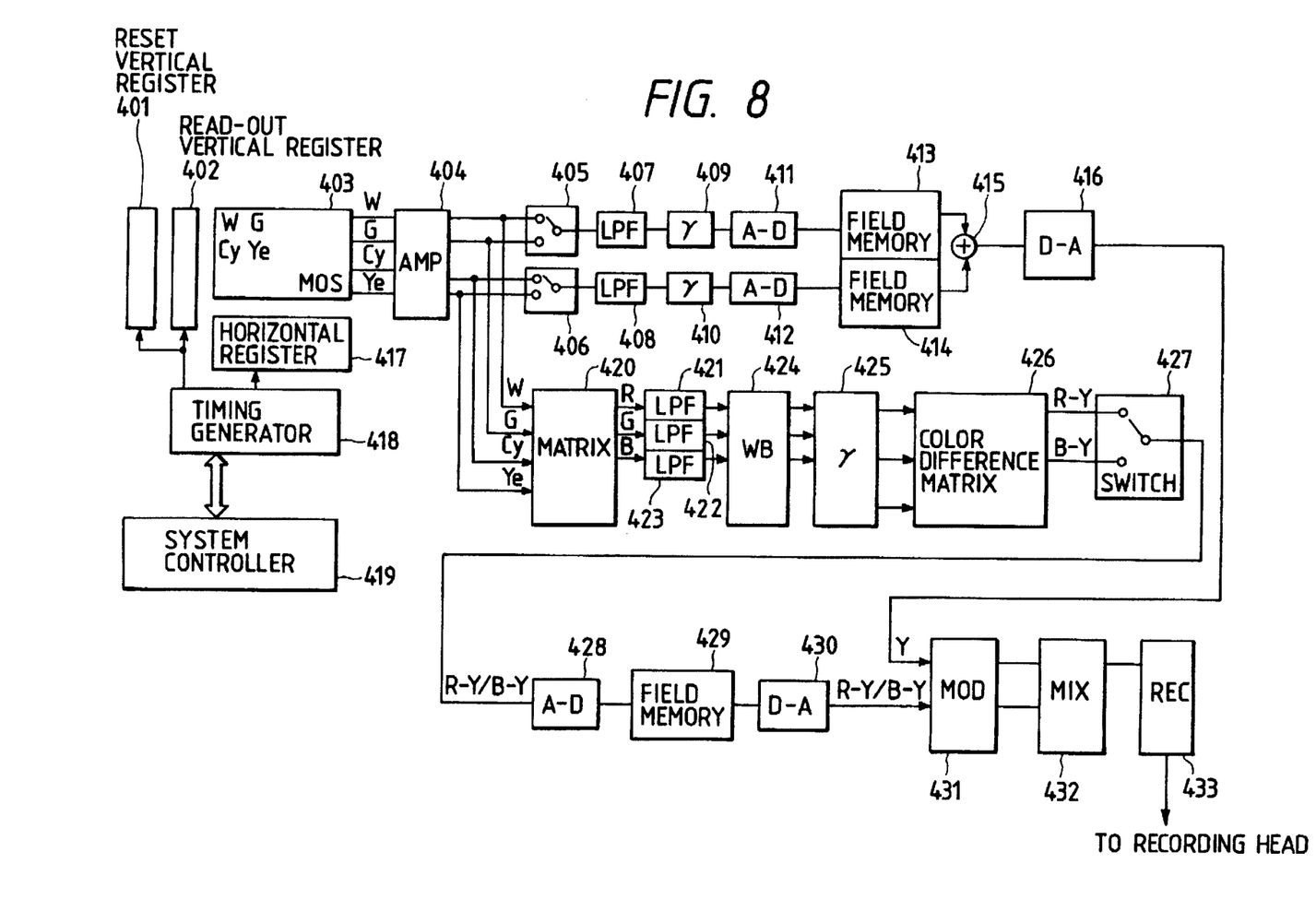
FIG. 8 is a structural view which illustrates an image pickup system according to a third embodiment of the present invention.
Figure 9:
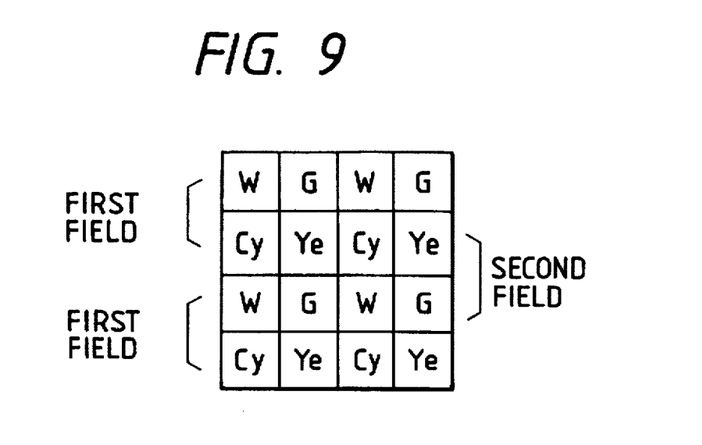
FIGS. 9 and 10 illustrate the configuration of the color filters.
Figure 10:
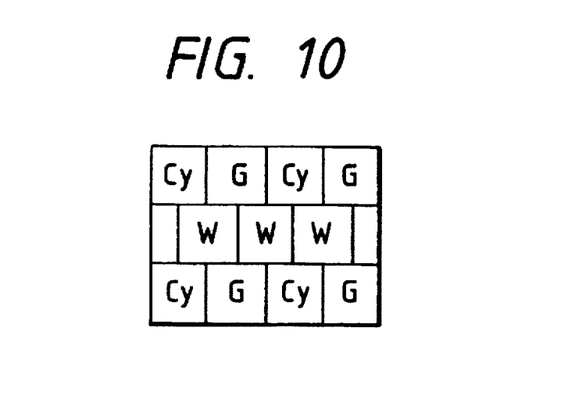

FIG. 8 is a structural view which illustrates the image pickup system of a still video camera according to the fourth embodiment of the present invention. An MOS type image pickup device 403 has color filters arranged as shown in FIG. 9 and fastened thereto.

A timing generator 418 scans a horizontal register 417, a vertical reset register 401 and a vertical reading register 402 so as to read out signals of the MOS type image pickup device 403 by a so-called "leading electronic shutter action" disclosed, for example, in Japanese Patent Publication No. 62-56713. The image pickup device 403 has four output lines which corresponds to the pixels of the W, G, Cy and Ye color filters so that all of pixel information items are temporarily read out in one field period. The pixel information thus-read is converted into a proper preamplifier 404 into a signal output of a low impedance.

The luminance signal is formed as follows:

A system controller 419 controls an operation of memories 413 and 414 such that signals fed from A/D converters 411 and 412 are stored in the memories 413 and 414, respectively. That is, signals W and G corresponding to color filters W and G disposed on the same horizontal row are switched over by a switch 405 by a reading clock (for example, 4 fsc, where fsc denotes a color sub-carrier frequency) so as to be individually fetched. The signals thus-fetched are subjected to a proper band limitation by a low-pass filter 407 before they are γ-converted by a γ-conversion portion 409. The γ-conversion may be performed by a broken-line approximation method. Then, the γ-converted data is, by an A-D converter 411, A-D converted by 4 fsc clock with 8 bits. Since it has been subjected to the γ-conversion, the 8 bits is sufficient to obtain a satisfactory result. The result of this is stored in a field memory 413. Assuming that the number of the significant horizontal pixels is 732 and that of the significant vertical pixels is 476, the field memory 413 is 732×476/2×8 bits=1.33M bits. It also applied to Cy and Ye so that signals denoting these colors are stored in the field memory 414.

Then, the system controller 419 commences the recording operation.

In the first field period, the address spaces are made to be equal before data in a field memory 413 and that in a field memory 414 are read out so as to be added to each other by an adder 415. The result of this addition is transmitted from a D/A converter 416 as an analog luminance signal Y.

In the second field period, the address of the first field memory 413 is always shifted from the address of the second field memory 414 by the degree of the number of data items (732 in this case) for one stage before data is read out. The data thus-read is D-A converted so as to be transmitted as an analog luminance signal Y.

As a result, the frame signal of the luminance signal can be formed similarly to that obtainable at the time of the movie operation.

Then, a method of forming a color signal will now be described.

Simultaneously with the operation of storing the first field of the luminance signal into the memories 413 and 414, four color signals W, G, Cy and Ye, which have passed through an amplifier 404, are subjected to a matrix operation in a matrix calculation portion 420 so as to be converted into R, G and B signals. The R, G and B signals are then subjected to a band limitation at low-pass filters 421, 422 and 423 having a narrow band before they are subjected to a white balance in a white balance portion 424. Then, they are γ-converted in a γ-conversion portion 425 so that Rγ, Gγ and Bγ signals are generated. The Rγ, Gγ and Bγ signals thus-generated are converted into two chrominance signals R - Y and B - Y. Since the still video format is arranged in such a manner that the chrominance signals R - Y and B - Y are placed in a linear sequential manner, the chrominance signals R - Y and B - Y are switched over at every one horizontal scanning period by a switch 427.

It is further preferable that the above-described switching operation is performed after a vertical low-pass filtering operation has been carried out by using a 1H delay device or the like. In this case, generation of false color in the vertical direction can be prevented.

The linear-sequential chrominance signals R - Y/B - Y is A-D converted by an A-D converter 428. Since the sampling clock of fsc or more is sufficient to be used in the above-described A-D conversion because the signal has been already subjected to the band limitation. It is preferable that the number of bits be 6 or more. The result of the A/D conversion is stored in a memory 429. Assuming that sampling is performed at fsc with 8 bits, the capacity becomes 732/2×476/2×8 bits=0.33M bits Therefore, the total memory capacity is, including that for the luminance, 1.33M bits×2+0.33M bits=2.99M bits. As a result, a satisfactory effect can be obtained because the memory can be constituted by three 1-M bit memories.

Then, at the time of the recording operation, chrominance information items of the same content are read out from the memory 429 in both of the first and second fields. Then, the chrominance information is D-A converted by a D/A converter 430 so that the frame signal denoting the chrominance is formed.

The luminance and chrominance signals thus-generated are converted by a conversion portion 431 before they are mixed with each other. Then, they are amplified by a recording amplifier portion 433 so as to be recorded to a floppy disk. In this manner, information of W, G, Cy and Ye is converted to the chrominance signals R-Y and B-Y by an analog processing and then A-D converted to be stored in memory. Therefore, high accurate A-D converter is not needed and a small capacity memory can be used.

According to this embodiment, the formation of the frame signal denoting the luminance is performed by two addition calculations carried out in such a manner that the combination of the first field memory and the second field memory is changed. The present invention is not limited to this. It may be performed in such a manner that a multiplicity of rows are weighted before they are processed by two different calculations such as averaging.

According to this embodiment, frame information about the chrominance is formed in such a manner that information for one frame is formed from information of two-times of supply (interpolation of the previous value) and information for one field. As an alternative to this, the mean value interpolation in the scanning line direction may be employed.

Although the memory 429 comprises the field memory, it may comprise a frame memory for recording two chrominance signals for the fields as an alternative to performing the chrominance line sequential formation.

The present invention is characterized in that the chrominance signals R - Y and B - Y possess information for one field or less. The effect of the present invention can be obtained from a structure in which a mechanical shutter is employed as an alternative to the electronic shutter.

Furthermore, the present invention can be applied to an MOD type image pickup device to which a color filter arranged as shown in FIG. 1D is fastened.

As described above, according to the embodiments of the present invention, a frame image signal can be formed by an image pickup device while eliminating the necessity of using a precise A-D converter, a D-A converter, for example, 10 bits and a large capacity memory. Therefore, the power consumption, the overall cost, the area required to place the parts can be reduced.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image pickup apparatus comprising:

an image pickup device;

mode selection means for selecting a mode from a group consisting of a video camera mode and a still video camera mode;

first drive means for, when said video camera mode is selected by said mode selection means, driving said image pickup device to perform an interlace-scanning operation so as to read vertically-disposed two pixels while being mixed with each other;

second drive means for, when said still video camera mode is selected by said mode selection means, driving said image pickup device to perform an interlace-scanning operation so as to read each row;

a memory for recording a first field signal and a second field signal of said image pickup device at the time of the operation performed by said second drive means;

addition means for adding said first field signal of said memory and said second field signal of the same to each other; and signal processing means for performing a signal process so as to generate a luminance signal and a chrominance signal in such a manner that it receives the output from said image pickup device when said video camera mode is selected by said mode selection means and receives the output from said addition means when said still video camera mode is selected by the same.

2. An image pickup apparatus according to claim 1, wherein said image pickup device has color filters A, B, C and D of different colors which are disposed in a pattern repeated in the lateral and vertical directions and arranged on 8 pixels, which are composed of two pixels in the lateral direction and 4 pixels in the vertical direction, in such a manner that said color filters A and B are disposed on the first row, said color filters C and D are disposed on the second row, said color filters A and B are disposed on the third row and said color filters D and C are disposed on the fourth row and said four different color filters are cyane, magenta, yellow and green filters.

3. A still video camera having an image pickup device to which color filters of three or more different colors are fastened so as to read out signals of all of pixels by a one-field scanning operation, said still video camera comprising:

means for A-D converting signals of pixels on odd rows selected from said signals of all of said pixels so as to record said signals of said pixels on said odd rows to a first field memory;

means for A-D converting signals of pixels on even rows selected from said signals of all of said pixels so as to record said signals of said pixels on said even rows to a second field memory;

analog processing means for forming a chrominance signal from said signals of all of said pixels;

means for A-D converting said chrominance signal so as to record said chrominance signal to a third memory;

means for performing two different calculations in accordance with the content of said first field memory and that of said second field memory to form a luminance signal of one frame;

and means for forming the chrominance signal of said one frame from the content of said third memory by performing an interpolating operation.

4. A still video camera according to claim 3, wherein said third memory is a field memory.

5. A camera comprising:

(a) image pickup means for photoelectrically converting a light incident through a color filter, said color filter having color array for providing a luminance component and a color component using color components of two lines adjacent in the vertical direction;

(b) mode setting means for designating a first read-out mode and a second read-out mode of said image pickup means;

(c) memory means for storing an output of said image pickup means when the second read-out mode is designated by said mode setting means, an operation of said memory means being switched in response to said mode setting means; and (d) signal processing means for receiving the output of said image pickup means when the first read-out mode is designated by said mode setting means and receiving an output of said memory means when the second read-out mode is designated and for generating a luminance signal and a color signal on the basis of the received output.

6. A video camera according to claim 5, wherein said color signal includes color difference signals.

7. A video camera according to claim 5, wherein said color filter includes a mosaic array of colors of yellow, cyan, magenta and green.

8. A video camera according to claim 5, wherein said memory means has a capacity of one frame.

9. A video signal according to claim 5, further comprising drive means for driving said image pickup means, said drive means changing a driving method of said image pickup means between the first read-out mode and the second read-out mode.

10. A video signal according to claim 5, wherein said image pickup means includes CCD.

* * * * *

UNITED STATES PATENT AND TRADEMARK OFFICE
CERTIFICATE OF CORRECTION

PATENT NO. : 5,734,424
DATED : March 31, 1998
INVENTOR(S) : Takashi Sasaki

It is certified that error appears in the above-identified patent and that said Letters Patent is hereby corrected as shown below:

On the title page, after item [22] insert item [30]

Foreign Application Priority Data
Aug. 8, 1990 [JP] Japan .................. 2-208242
Aug. 8, 1990 [JP] Japan .................. 2-208243
Aug. 8, 1990 [JP] Japan .................. 2-208244

Signed and Sealed this

Fifteenth Day of September, 1998

*Attest:*

BRUCE LEHMAN

*Attesting Officer*   *Commissioner of Patents and Trademarks*